Jan. 10, 1956  R. F. MASON  2,729,929
DISK PLOW
Filed Nov. 7, 1952  2 Sheets-Sheet 1
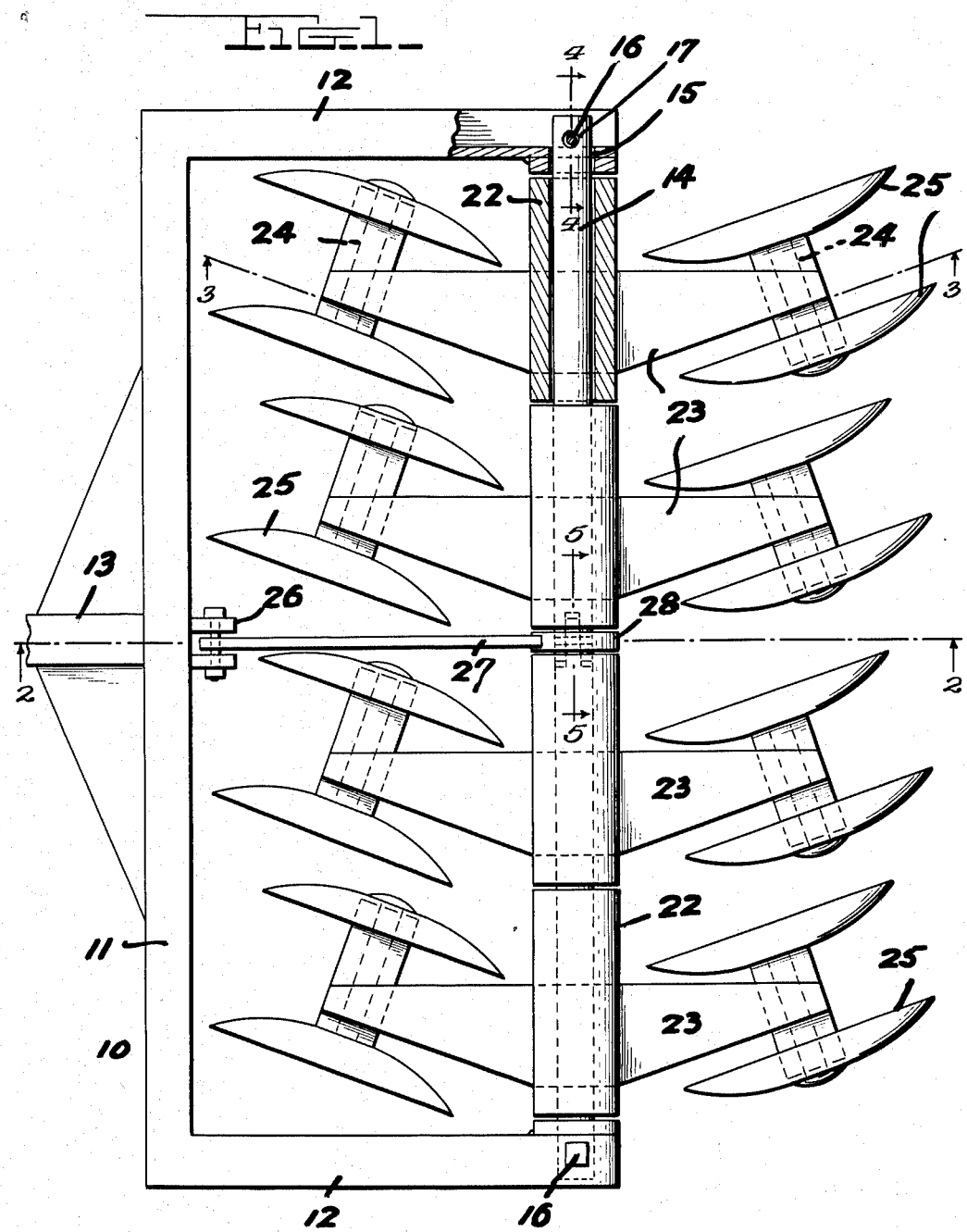
INVENTOR.
Robert F. Mason
BY
atty.

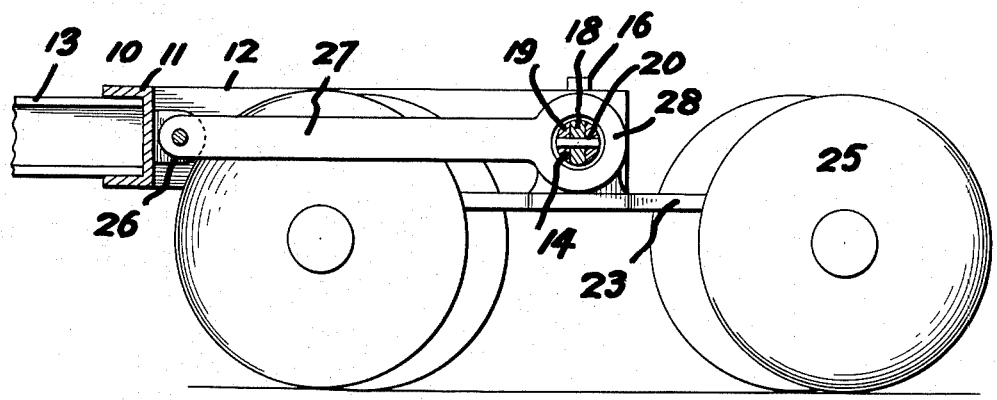
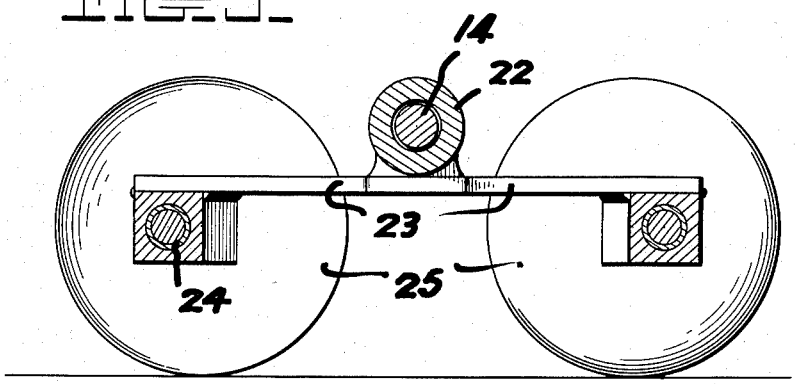
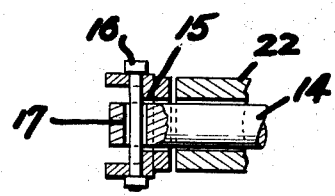
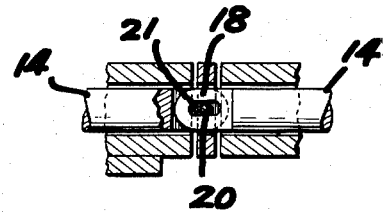
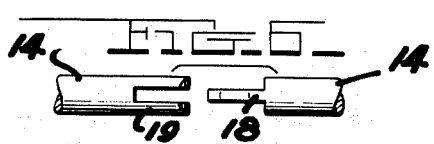

United States Patent Office 2,729,929
Patented Jan. 10, 1956

2,729,929

DISK PLOW

Robert F. Mason, Magee, Miss.

Application November 7, 1952, Serial No. 319,360

2 Claims. (Cl. 55—81)

This invention is a disk plow to be attached to and propelled by power tractors of the type now in general use.

The main purpose of the plow of this invention is to provide means whereby the earth may be dug and thoroughly agitated as the plow is moved over the ground and in such manner that a broad surface or swath is cut and made suitable for planting purposes.

A further object of the invention is to provide a disk plow structure which is capable of accommodating itself to undulations or irregularities in the surface of the soil, as well as to minimize the opportunity for wear or breakage of any of the disk elements in the event they come in contact with rock, roots or other damaging elements present either upon or in the subsurface of the soil.

A further object of the invention is to provide a disk plow so constructed as to be capable of quick and easy attachment to standard tractor structures, which is of simple and inexpensive construction, which involves the use of but few parts, which has the parts so constructed and assembled as to minmize the opportunity for wear, breakage or derangement, and which will prove fully practical and efficient in operation.

With the foregoing objects in view, together with others which will appear as the description proceeds, the invention resides in the novel construction, combination and arrangement of parts, all as will be described more fully hereinafter, illustrated in the drawings, and particularly pointed out in the claims, wherein:

Fig. 1 is a top plan view, parts broken away, of a disk plow structure involving the invention, Fig. 2 is a transverse sectional view taken substantially upon the line 2—2 of Fig. 1, Fig. 3 is a similar view taken upon line 3—3 of Fig. 1, Fig. 4 is a sectional view taken upon line 4—4 of Fig. 1, Fig. 5 is a similar view taken upon line 5—5 of Fig. 1, and Fig. 6 is a detail plan view showing the manner in which the supporting bar ends may be hingedly connected one to the other.

Referring now more particularly to the drawing, the supporting frame for the disk or cutting elements is indicated generally at 10, and comprises an elongated beam 11 constituting the base of the frame, with arm members 12 projecting at right angles to and rigidly connected with the beam 11. These elements may be made of channel iron or any other suitable material of sufficient strength to support the structure to be hereafter described and to withstand the strains and stresses to which it must be necessarily subjected in the operation of the plow. The beam or base 11 has projecting therefrom, preferably intermediate its ends, a bar 13 by means of which the plow may be connected either to the fore or rear end of a tractor.

The frame also includes a supporting bar or shaft 14 connecting the free or rear ends of the arms 12 and parallel with the beam or bar 11. The rear ends of the arms 12 are apertured as at 15 to loosely receive the ends of the bar 14, and cross pins 16, passed through the rear ends of arms 12 as well as enlarged openings 17 in the bar ends, securely hold the bar ends in proper position in the frame.

The bar 14, thus loosely mounted at its outer ends in the arms 12, comprises sections of equal length as shown in Fig. 1, and these sections are hingedly connected together at their adjoining ends, midway the breadth of the frame, as shown more particularly in Figs. 2, 5 and 6. One of the adjacent ends of the bar sections is reduced to provide a tongue 18, while the adjoining bar section is recessed at 19 for the loose accommodation of the said tongue, and the said ends are provided with aligned openings to receive a hinge pin 20. It will be observed, with particular reference to Fig. 5, that the opening 21 in the tongue 18 is elongated to permit of limited longitudinal movement of one bar section relative to the other.

The bar 14 rotatably supports elongated sleeves or bearing members 22, loosely and rotatably mounted upon the bar. Each sleeve has projecting therefrom in opposite directions disk arms 23, the free ends of which are provided with laterally disposed bearing members 24 to rotatably support cutting disks 25. If desired, each of the disk arms 23 may accommodate a single disk, or these disks may be provided in pairs as shown in the drawing, and the disks on the ends of these disk arms are so mounted as to be in substantial alignment with one another in the direction of draft of the frame 10. It is preferred that these disks be arranged at angles to one another as shown so as to divert or laterally throw the earth to one side as the frame advances over the ground. In the present instance, the disks 25 are arranged in pairs at the ends of disk arms 23, and the disks of each pair are in parallelism with one another. The angularity of the supporting bearings 24 on the respective shaft ends is such that while the disks 25 are in substantial alignment from the standpoint of the direction of draft of the frame, they will throw the dirt in opposite directions to one another. The bearing sleeves 22 and their disk arms 23 are arranged in such number upon the supporting bar or shaft 14 as to properly be accommodated by the bar. The arrangement is such that as the frame is drawn along the ground, the disks first engaging the soil will remove it and throw it laterally into the path of the oncoming disk upon the opposite side of the trailing disk arm 23, whereupon the trailing disk will throw it back in the reverse direction. In this manner, the earth is not only severed but is tossed back and forth in such manner as to thoroughly break up and agitate the soil and thus reduce it to a proper condition for planting.

Pivotally secured within a bracket 26 on the rear face of the draft beam 11 and preferably midway the ends of the frame 10 is a link 27, the rear end of which is provided with an annulus 28 to encircle and loosely accommodate the hinged ends of the shaft sections 14. This link thus constitutes a support for the hinged bar ends and assists in reenforcing the shaft.

The sleeves 22 which carry the disk supporting arms 23 are of such length as to be in substantial abutment with one another longitudinally of the supporting bar 14, and are free to oscillate or rotate upon the said bar. The loose connection of the ends of the bar or shaft 14 with the rear ends of arms 12 permit a certain amount of flexibility in the shaft ends, while the hinge connection midway the ends of the shaft 14 permits substantial flexibility of the shaft. This construction and arrangement is provided in order that the ground engaging disks may accommodate themselves to undulations or irregularities in the surface of the soil, as well as to enable the disks sufficient movement in vertical directions to pass or ride over rock, roots or other objects either upon or in the sub-surface of the soil to prevent breakage or derangement either of the disks or the supporting structures therefor.

From the foregoing it is obvious that I have provided a disk plow fully capable of accomplishing the various objects set forth and which will perform in a fully capable, economical and efficient manner.

I claim:

1. In a disk plow, a draft beam, arms projecting rearwardly and in parallelism from the ends of said beam, shaft sections loosely mounted at their outer ends in the extremities of said arms, a hinge member connecting the inner ends of said shaft sections, a link pivoted at one end to said beam and extending rearwardly therefrom in parallelism with said arms, an annulus on the rear end of said link loosely enclosing the joined ends of said shaft sections, sleeves rotatably mounted on said shaft sections, disk arms projecting laterally from said sleeves in opposite directions, and disks rotatably mounted at the ends of said disk arms.

2. In a disk plow, a draft beam, arms projecting rearwardly and in parallelism with one another from the ends of said beam, a sectional shaft provided with a hinge intermediate its ends having its outer extremities loosely supported in the rear ends of said arms and disposed parallel with said beam, a link pivotally connected at its forward end to said beam and extending rearwardly therefrom, an annulus at the rear end of said link enclosing said shaft sections at the hinged connection thereof, sleeves rotatably mounted on said shaft sections, disk arms projecting laterally in opposite directions from said sleeves, disk members arranged in pairs and rotatably supported at the free ends of said disk arms, and the disks on one of said disk arms being longitudinally aligned with the disks at the end of the companion disk arm.

References Cited in the file of this patent

UNITED STATES PATENTS

| | | |
|---|---|---|
| 357,724 | McSherry | Feb. 15, 1887 |
| 382,731 | Richards | May 15, 1888 |
| 730,837 | Nichols | June 9, 1903 |
| 1,302,146 | Fetzer | Apr. 29, 1919 |
| 1,419,585 | Paige | June 13, 1922 |

FOREIGN PATENTS

| | | |
|---|---|---|
| 641,774 | Great Britain | Aug. 16, 1950 |